United States Patent
Huang et al.

(10) Patent No.: US 10,219,003 B2
(45) Date of Patent: Feb. 26, 2019

(54) INTRA-FRAME PREDICTIVE CODING AND DECODING METHODS BASED ON TEMPLATE MATCHING, ARRAY SCANNING METHOD AND APPARATUS, AND APPARATUS

(71) Applicant: Huawei Technologies Co., Ltd., Shenzhen (CN)

(72) Inventors: Xin Huang, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 15/362,477

(22) Filed: Nov. 28, 2016

(65) Prior Publication Data
US 2017/0078696 A1 Mar. 16, 2017

Related U.S. Application Data

(63) Continuation of application No. PCT/CN2015/080020, filed on May 28, 2015.

(30) Foreign Application Priority Data

May 28, 2014 (CN) .......................... 2014 1 0231177

(51) Int. Cl.
*H04N 19/593* (2014.01)
*H04N 19/129* (2014.01)
(Continued)

(52) U.S. Cl.
CPC ......... *H04N 19/593* (2014.11); *H04N 19/129* (2014.11); *H04N 19/157* (2014.11);
(Continued)

(58) Field of Classification Search
None
See application file for complete search history.

(56) References Cited

U.S. PATENT DOCUMENTS 5,583,657 A 12/1996 Jeong
8,228,990 B2 7/2012 Visharam et al.
(Continued)

FOREIGN PATENT DOCUMENTS

CN 101415122 A 4/2009
CN 101557514 A 10/2009
(Continued)

OTHER PUBLICATIONS

Turkan et al., "Image Prediction Based on Neighbor-Embedding Methods," IEEE Transactions on Image Processing, vol. 21, No. 4, pp. 1885-1898, XP002674661, Institute of Electrical and Electronics Engineers, New York, New York (Apr. 2012).
(Continued)

*Primary Examiner* — Anand S Rao
*Assistant Examiner* — Samuel D Fereja
(74) *Attorney, Agent, or Firm* — Leydig, Voit & Mayer, Ltd.

(57) ABSTRACT

According to intra-frame predictive coding and decoding methods based on template matching, an array scanning method and apparatus, and an apparatus are disclosed in embodiments of the present disclosure, where templates of at least two shapes are used to calculate predicted pixel values of a to-be-predicted unit. Templates of different shapes can represent different textures; when a correlation between a texture of a template of a shape and a texture of a to-be-predicted unit is low, a template of another shape may be selected and used, and a matching degree between a texture of a template and a texture of a to-be-predicted unit can be increased. In this way, an optimal predicted pixel
(Continued)

value is determined from at least two predicted pixel values, and accuracy of the optimal predicted pixel value is higher than accuracy of a predicted pixel value determined by using a template of a single shape.

20 Claims, 8 Drawing Sheets

(51) Int. Cl.
*H04N 19/182* (2014.01)
*H04N 19/176* (2014.01)
*H04N 19/157* (2014.01)
*H04N 19/11* (2014.01)
*H04N 19/124* (2014.01)
*H04N 19/147* (2014.01)

(52) U.S. Cl.
CPC ......... *H04N 19/176* (2014.11); *H04N 19/182* (2014.11); *H04N 19/11* (2014.11); *H04N 19/124* (2014.11); *H04N 19/147* (2014.11)

(56) References Cited

U.S. PATENT DOCUMENTS

| | | | |
|---|---|---|---|
| 8,538,177 | B2 | 9/2013 | Xu et al. |
| 2009/0003443 | A1 | 1/2009 | Guo et al. |
| 2009/0116760 | A1 | 5/2009 | Boon et al. |
| 2009/0180538 | A1* | 7/2009 | Visharam ............ H04N 19/176 375/240.15 |
| 2010/0118940 | A1 | 5/2010 | Yin et al. |
| 2010/0208814 | A1 | 8/2010 | Xiong et al. |
| 2010/0246675 | A1 | 9/2010 | Gharavi-Alkhansari et al. |
| 2010/0272183 | A1 | 10/2010 | Kamp et al. |
| 2011/0286521 | A1 | 11/2011 | Amonou et al. |
| 2012/0281752 | A1 | 11/2012 | Zheng et al. |

FOREIGN PATENT DOCUMENTS

| | | |
|---|---|---|
| CN | 101572818 A | 11/2009 |
| CN | 101715135 A | 5/2010 |
| CN | 101854545 A | 10/2010 |
| CN | 102196270 A | 9/2011 |
| CN | 102215386 A | 10/2011 |
| CN | 102215407 A | 10/2011 |
| CN | 102427530 A | 4/2012 |
| EP | 1919223 A1 | 5/2008 |
| JP | H06245200 A | 9/1994 |
| JP | 2007043651 A | 2/2007 |
| JP | 2007300380 A | 11/2007 |
| WO | WO 2010086544 A1 | 8/2010 |

OTHER PUBLICATIONS

Tan et al., "Intra Prediction by Averaged Template Matching Predictors," IEEE Consumer Communications and Networking Conference, XP31087817, pp. 405-409, Institute of Electrical and Electronics Engineers, New York, New York (2007).

Sullivan et al., "Overview of the High Efficiency Video Coding (HEVC) Standard," IEEE Transactions on Circuits and Systems for Video Technology, vol. 22, No. 12, pp. 1649-1668, XP55284729, Institute of Electrical and Electronics Engineers, New York, New York (Dec. 2012).

Guionnet et al., "Intra prediction based on weighted template matching predictors (WTM)," Joint Collaborative Team on Video Coding (JCT-VC) of ITU-T SG16 WP3 and ISO/IEC JTC1/SC29/WG11, JCTVC-G598, XP030110582, 7th meeting, Geneva, CH, International Telecommunication Union, Geneva, Switzerland (Nov. 21-30, 2011).

McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, JCTVC-A124, XP055036046, 1st meeting, Dresden, DE, International Telecommunication Union, Geneva, Switzerland (Apr. 15-23, 2010).

Jiang et al., "A New Intraframe Prediction Using Template Matching with Rotation," FIT 2012 (Forum on Information Technology 2012), pp. 299-300, The Institute of Electronics, Information and Communication Engineers, Information Processing Society of Japan, (2012).

Chen et al., "Adaptive Patch Matching for Motion Compensated Prediction," IEEE Circuits and Systems, pp. 2621-2624, Institute of Electrical and Electronics Engineers, New York, New York (2011).

Lin et al., "Template Matching for Image Prediction: A Game-Theoretical Approach," IEEE Signals, Systems and Computers, pp. 821-824, Institute of Electrical and Electronics Engineers, New York, New York (2012).

"Series H: Audiovisual and Multimedia Systems; Infrastructure of audiovisual services—Coding of moving video; Advanced video coding for generic audiovisual services," ITU-H.264, Telecommunication Standardization Sector of ITU, Geneva, Switzerland (Feb. 2014).

* cited by examiner

INTRA-FRAME PREDICTIVE CODING AND DECODING METHODS BASED ON TEMPLATE MATCHING, ARRAY SCANNING METHOD AND APPARATUS, AND APPARATUS

CROSS-REFERENCE TO RELATED APPLICATIONS

This application is a continuation application of International Application No. PCT/CN2015/080020, filed on May 28, 2015, which claims priority to Chinese Patent Application No. 201410231177.2, filed on May 28, 2014. The disclosures of the aforementioned applications are hereby incorporated by reference in their entireties.

TECHNICAL FIELD

The embodiments of the present disclosure relates to the image compression field, and in particular, to an intra-frame predictive coding method based on template matching and an apparatus.

BACKGROUND

In the image compression field, it is proved that a method for performing intra-frame prediction by using an information correlation between non-adjacent regions can effectively improve prediction quality. An intra-frame predictive coding method based on L-shaped-template matching belongs to this type of method.

A theory hypothesis of the intra-frame predictive coding method based on L-shaped-template matching is as follows: there is a relatively strong texture correlation between image information in a prediction unit and image information in an L-shaped template. However, when a texture of a to-be-compressed image is complex and variable, a correlation between an image texture in a prediction unit and an image texture in an L-shaped template is generally low, and the foregoing theory hypothesis may not valid. In this case, if the L-shaped template is still used to perform intra-frame predictive coding, accuracy of the prediction unit may be reduced.

It can be seen that, when a texture of a to-be-compressed image is complex, how to ensure accuracy of a prediction unit becomes a currently to be resolved problem.

SUMMARY

Embodiments of the present disclosure provide an intra-frame predictive coding method based on template matching and an apparatus, so as to resolve a problem of how to ensure accuracy of a prediction unit when a texture of a to-be-compressed image is complex and variable.

To achieve the foregoing objective, the following technical solutions are disclosed in the embodiments of the present disclosure:

A first aspect of the embodiments of the present disclosure provides an intra-frame predictive coding method based on template matching, including:

determining a predicted pixel value of a to-be-predicted unit by using a template of an $i^{th}$ shape, where the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and selecting a predicted pixel value that is in N predicted pixel values of the to-be-predicted unit and meets a preset condition as an optimal predicted pixel value of the to-be-predicted unit, where the optimal predicted pixel value of the to-be-predicted unit is used for coding.

In a first implementation manner of the first aspect of the embodiments of the present disclosure, the determining a predicted pixel value of a to-be-predicted unit by using a template of an $i^{th}$ shape includes:

determining a predicted pixel value of a subunit sj in the to-be-predicted unit by using a template ix of the $i^{th}$ shape, where the subunit sj is a region that is in the to-be-predicted unit, that has a same shape as the template ix, and that is adjacent to the template ix; j=1, 2, . . . , M; x=1, 2, . . . , M; M is an integer greater than or equal to 2; s1 Us2 U . . . UsM is equal to the to-be-predicted unit; the subunits s1, s2, sM are successively away from an adjacent reconstructed region; and the template ix has a different size.

In a second implementation manner of the first aspect of the embodiments of the present disclosure, the intra-frame predictive coding method based on template matching further includes:

calculating a difference between the optimal predicted pixel value of the to-be-predicted unit and an original pixel value of the to-be-predicted unit to obtain a residual signal;

obtaining a two-dimensional quantized transform coefficient array according to the residual signal;

determining a scanning sequence according to energy distribution of the residual signal; and scanning the two-dimensional quantized transform coefficient array according to the scanning sequence.

In a third implementation manner of the first aspect of the embodiments of the present disclosure, the determining a scanning sequence according to energy distribution of the residual signal includes:

when a template used to obtain the optimal predicted pixel value is an L-shaped template, determining that the scanning sequence is diagonal scanning; or when a template used to obtain the optimal predicted pixel value is a straight-line shaped template, determining that the scanning sequence is horizontal scanning; or when a template used to obtain the optimal predicted pixel value is a l-shaped template, determining that the scanning sequence is vertical scanning.

In a fourth implementation manner of the first aspect of the embodiments of the present disclosure, the calculating a predicted pixel value of a to-be-predicted unit by using a template of an $i^{th}$ shape includes:

calculating the predicted pixel value of the to-be-predicted unit separately by using the L-shaped template, the straight-line shaped template, and the l-shaped template.

In a fifth implementation manner of the first aspect of the embodiments of the present disclosure, the intra-frame predictive coding method based on template matching further includes:

sending, to a decoder side, information about a template that is used to obtain the optimal predicted pixel value of the to-be-predicted unit, where the information about the template is used by the decoder side to perform decoding.

In a sixth implementation manner of the first aspect of the embodiments of the present disclosure, the preset condition includes:

a rate-distortion cost (RD cost) is lowest.

A second aspect of the embodiments of the present disclosure provides an intra-frame predictive decoding method based on template matching, including:

receiving information that indicates an optimal template, where the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, where the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and determining the optimal predicted pixel value of the to-be-predicted unit by using the optimal template, where the optimal predicted pixel value of the to-be-predicted unit is used for decoding.

A third aspect of the embodiments of the present disclosure provides an array scanning method, including:

calculating a difference between an optimal predicted pixel value of a to-be-predicted unit and an original pixel value of the to-be-predicted unit to obtain a residual signal, where the optimal predicted pixel value of the to-be-predicted unit is a predicted pixel value that is in N predicted pixel values of the to-be-predicted unit and meets a preset condition, where the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2;

obtaining a two-dimensional quantized transform coefficient array according to the residual signal;

determining a scanning sequence according to energy distribution of the residual signal; and scanning the two-dimensional quantized transform coefficient array according to the scanning sequence.

In a first implementation manner of the third aspect of the embodiments of the present disclosure, the determining a scanning sequence according to energy distribution of the residual signal includes:

when a template used to obtain the optimal predicted pixel value is an L-shaped template, determining that the scanning sequence is diagonal scanning; or when a template used to obtain the optimal predicted pixel value is a straight-line shaped template, determining that the scanning sequence is horizontal scanning; or when a template used to obtain the optimal predicted pixel value is a l-shaped template, determining that the scanning sequence is vertical scanning.

A fourth aspect of the embodiments of the present disclosure provides an encoder, including:

a determining module, configured to determine a predicted pixel value of a to-be-predicted unit by using a template of an $i^{th}$ shape, where the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and a selection module, configured to select a predicted pixel value that is in N predicted pixel values of the to-be-predicted unit and meets a preset condition as an optimal predicted pixel value of the to-be-predicted unit, where the optimal predicted pixel value of the to-be-predicted unit is used for coding.

In a first implementation manner of the fourth aspect of the embodiments of the present disclosure, that a determining module is configured to determine a predicted pixel value of a to-be-predicted unit by using a template of an $i^{th}$ shape includes:

the determining module is specifically configured to determine a predicted pixel value of a subunit sj in the to-be-predicted unit by using a template ix of the $i^{th}$ shape, where the subunit sj is a region that is in the to-be-predicted unit, that has a same shape as the template ix, and that is adjacent to the template ix; j=1, 2, . . . , M; x=1, 2, . . . , M; M is an integer greater than or equal to 2; s1 ∪ s2 ∪ . . . ∪ sM is equal to the to-be-predicted unit; the subunits s1, s2, sM are successively away from an adjacent reconstructed region; and the template ix has a different size.

In a second implementation manner of the fourth aspect of the embodiments of the present disclosure, the encoder further includes:

a scanning module, configured to: calculate a difference between the optimal predicted pixel value of the to-be-predicted unit and an original pixel value of the to-be-predicted unit to obtain a residual signal; obtain a two-dimensional quantized transform coefficient array according to the residual signal; determine a scanning sequence according to energy distribution of the residual signal; and scan the two-dimensional quantized transform coefficient array according to the scanning sequence.

In a third implementation manner of the fourth aspect of the embodiments of the present disclosure, that a scanning module is configured to determine a scanning sequence according to energy distribution of the residual signal includes:

the scanning module is specifically configured to: when a template used to obtain the optimal predicted pixel value is an L-shaped template, determine that the scanning sequence is diagonal scanning; or when a template used to obtain the optimal predicted pixel value is a straight-line shaped template, determine that the scanning sequence is horizontal scanning; or when a template used to obtain the optimal predicted pixel value is a l-shaped template, determine that the scanning sequence is vertical scanning.

In a fourth implementation manner of the fourth aspect of the embodiments of the present disclosure, that a determining module calculates a predicted pixel value of a to-be-predicted unit by using a template of an $i^{th}$ shape includes:

the determining module is specifically configured to calculate the predicted pixel value of the to-be-predicted unit separately by using the L-shaped template, the straight-line shaped template, and the l-shaped template.

In a fifth implementation manner of the fourth aspect of the embodiments of the present disclosure, the encoder further includes:

a sending module, configured to send, to a decoder side, information about a template that is used to obtain the optimal predicted pixel value of the to-be-predicted unit, where the information about the template is used by the decoder side to perform decoding.

A fifth aspect of the embodiments of the present disclosure provides a decoder, including:

a receiving module, configured to receive information that indicates an optimal template, where the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, where the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and a prediction module, configured to determine the optimal predicted pixel value of the to-be-predicted unit by using the optimal template, where the optimal predicted pixel value of the to-be-predicted unit is used for decoding.

A sixth aspect of the embodiments of the present disclosure provides an array scanning apparatus, including:

a calculation module, configured to calculate a difference between an optimal predicted pixel value of a to-be-predicted unit and an original pixel value of the to-be-predicted unit to obtain a residual signal, where the optimal predicted pixel value of the to-be-predicted unit is a predicted pixel value that is in N predicted pixel values of the to-be-predicted unit and meets a preset condition, where the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2;

a transform module, configured to obtain a two-dimensional quantized transform coefficient array according to the residual signal;

a scanning sequence determining module, configured to determine a scanning sequence according to energy distribution of the residual signal; and a scanning module, configured to scan the two-dimensional quantized transform coefficient array according to the scanning sequence.

In a first implementation manner of the sixth aspect of the embodiments of the present disclosure, that a scanning sequence determining module is configured to determine a scanning sequence according to energy distribution of the residual signal includes:

the scanning sequence determining module is specifically configured to: when a template used to obtain the optimal predicted pixel value is an L-shaped template, determine that the scanning sequence is diagonal scanning; or when a template used to obtain the optimal predicted pixel value is a straight-line shaped template, determine that the scanning sequence is horizontal scanning; or when a template used to obtain the optimal predicted pixel value is a l-shaped template, determine that the scanning sequence is vertical scanning.

According to intra-frame predictive coding and decoding methods based on template matching, an array scanning method and apparatus, and an apparatus disclosed by embodiments of the present disclosure, templates of at least two shapes are used to calculate predicted pixel values of a to-be-predicted unit. Intra-frame prediction based on template matching is performed based on a correlation between a texture of a template region and a texture of a to-be-predicted unit. Compared with a template of a single shape, templates of different shapes can represent different textures; when a correlation between a texture of a template of a shape and a texture of a to-be-predicted unit is low, a template of another shape may be selected and used, and a matching degree between a texture of a template and the texture of the to-be-predicted unit can be thereby increased. In this way, an optimal predicted pixel value is determined from at least two predicted pixel values, and accuracy of the optimal predicted pixel value is higher than accuracy of a predicted pixel value determined by using a template of a single shape.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
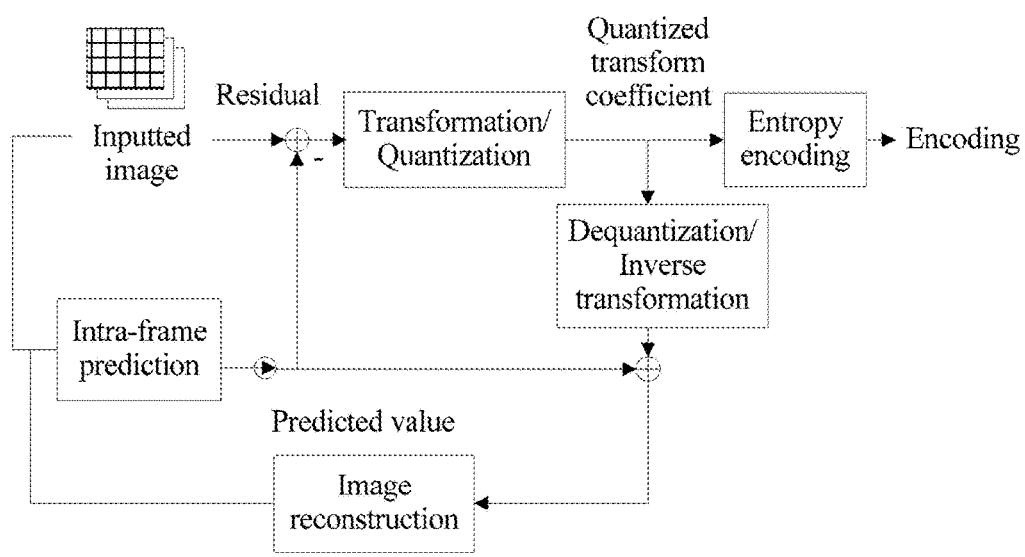
FIG. 1 is a schematic diagram of intra-frame predictive coding based on template matching according to an embodiment of the present disclosure.

Embodiments of the present disclosure disclose an intra-frame predictive coding method based on template matching and an apparatus. FIG. 1 is a schematic diagram of intra-frame predictive coding based on template matching. A to-be-compressed image is divided into distinct independent image blocks, and each image block is coded in sequence according to a processing sequence. Each image block is referred to as a coding tree unit (CTU), and a default size of each image block is generally 64*64 (pixels). The CTU may be further divided into multiple subunits, and each subunit is a coding unit (CU) whose coding parameter can be separately determined. The coding parameter of each CU can be separately selected, such as an intra-frame prediction template, prediction unit (PU) division, and a mode of performing a prediction operation by means of an intra-frame prediction template and prediction unit division.

As shown in FIG. 1, a coding process is as follows: a predicted pixel value of a prediction unit is obtained by means of intra-frame prediction; a residual signal is obtained by calculating a difference between an optimal predicted pixel value of the prediction unit and an original pixel value of a prediction unit of an inputted image; a quantized transform coefficient is obtained by transforming and quantizing the residual signal; an entropy coding operation is performed on the quantized transform coefficient; and a bit string outputted after the entropy coding operation is inserted into a bitstream, and the process of image compression coding is completed. To ensure synchronous decoding, dequantization and inverse transformation may be performed on the quantized transform coefficient, so as to obtain a reconstructed residual signal, and the reconstructed residual signal and the predicted pixel value of the prediction unit may be added, so as to obtain corresponding reconstructed image information, where the reconstructed image information may be used for subsequent intra-frame prediction.

The embodiments of the present disclosure focus on a process of obtaining a predicted pixel value of a to-be-predicted unit by means of intra-frame prediction in a coding process.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

An intra-frame predictive coding method based on template matching disclosed by an embodiment of the present disclosure includes:

calculating a predicted pixel value of a to-be-predicted unit by using a template of an $i^{th}$ shape, where the to-be-predicted unit is adjacent to the template of the $i^{th}$ shape, an $i^{th}$ predicted pixel value is determined according to the template of the $i^{th}$ shape, $i=1, 2, \ldots, N$, and N is an integer greater than or equal to 2; and selecting a predicted pixel value that is in N predicted pixel values of the to-be-predicted unit and meets a preset condition as an optimal predicted pixel value of the to-be-predicted unit, where the optimal predicted pixel value of the to-be-predicted unit is used for coding.

In the intra-frame predictive coding method based on template matching, a template is used to perform a hit search (also called matching search) in a reconstructed region. In an existing intra-frame predictive coding method based on template matching, a template of only a single shape is used for hitting. Therefore, when a difference between a texture of a prediction unit and a texture of a template is relatively great, accuracy of an obtained predicted pixel value of the prediction unit is reduced. Furthermore, because an obtained residual signal is relatively large, coding efficiency is reduced.

In the method in this embodiment, templates of at least two shapes are separately used to calculate a predicted pixel value of a to-be-predicted unit. A predicted pixel value that is in the predicted pixel values and that is closest to an original pixel value is an optimal predicted pixel value. It can be seen that, when a texture of a to-be-compressed image is complex and variable, a texture of a region in which a different template is located is different. Therefore, compared with an existing method in which a template of a single shape is used, templates of different shapes are more likely to hit a texture of the to-be prediction unit. That is, because the templates of different shapes are used, a probability that textures of the templates match the texture of the to-be-predicted unit is increased, and accuracy of a predicted pixel value of the to-be-predicted unit is improved, thereby further reducing a residual signal, and increasing compression coding efficiency.

Obviously, more shape types of templates lead to an optimal predicted pixel value closer to an original pixel value. In practice, accuracy and a calculation amount may be balanced to obtain an optimal predicted pixel value that meets a requirement. The following uses N=3 as an example for detailed description.

Figure 2:
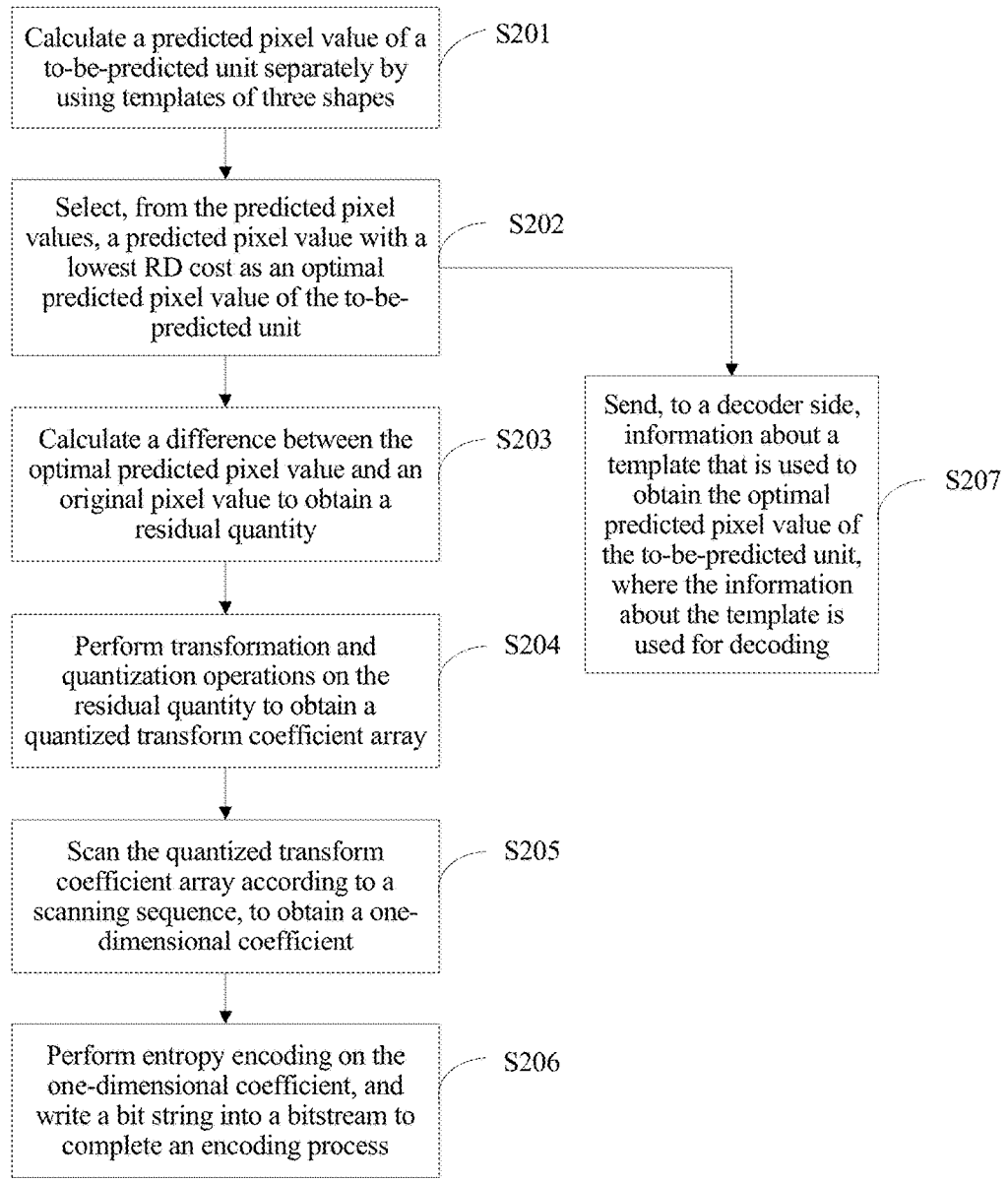
FIG. 2 is a flowchart of an intra-frame predictive coding method based on template matching according to an embodiment of the present disclosure.

As shown in FIG. 2, another intra-frame predictive coding method based on template matching disclosed by an embodiment of the present disclosure includes:

S201: Calculate a predicted pixel value of a to-be-predicted unit separately by using templates of three shapes.

Figure 3:
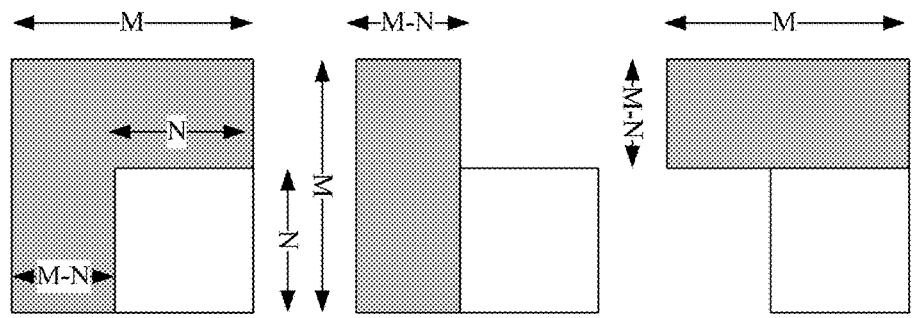
FIG. 3 is a schematic diagram of a position relationship between a to-be-predicted unit and three types of templates according to an embodiment of the present disclosure.

In this embodiment, optionally, the templates of the three shapes are respectively an L-shaped template, a straight-line shaped template, and a l-shaped template. Position relationships between the three templates and the to-be-predicted unit are shown in FIG. 3. The L-shaped template is adjacent to the to-be-predicted unit, and consists of a region on top of and a region on the left of the to-be-predicted unit. The straight-line shaped template is adjacent to the to-be-predicted unit, and consists of a region on top of the to-be-predicted unit. The l-shaped template is adjacent to the to-be-predicted unit, and consists of a region on the left of the to-be-predicted unit. When a size of the to-be-predicted unit is N*N, an internal side length of the L-shaped template is N and an external side length is M; a length of the straight-line shaped template is M and a width is M−N; a length of the l-shaped template is M and a width is M−N, where a value of M is not limited herein. It should be noted that, the shapes of the templates in this embodiment are only used as an example for description. A shape of a template that can be used in the present disclosure is not limited to the foregoing shapes.

Figure 4:
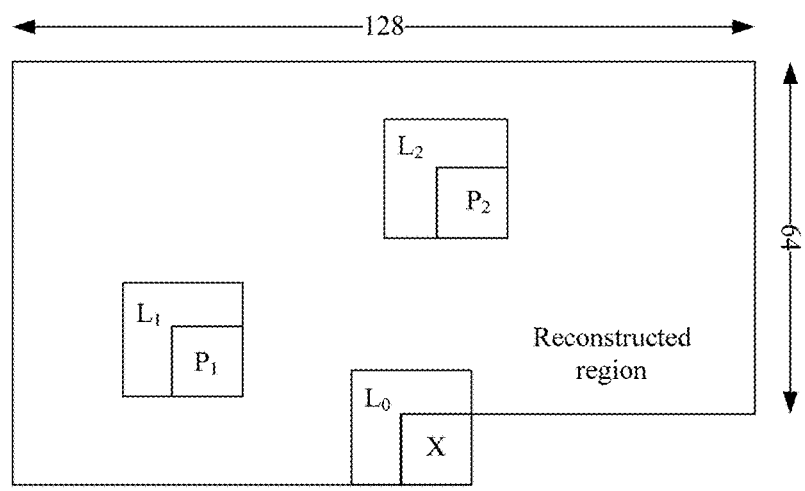
FIG. 4 is a schematic diagram of a process of determining a predicted pixel value of a to-be-predicted unit by using an L-shaped template according to an embodiment of the present disclosure.

The L-shaped template is used as an example. A process of determining the predicted pixel value of the to-be-predicted unit by using the L-shaped template is shown in FIG. 4.

The L-shaped template is defined in a reconstructed region on top of and on the left of the to-be-predicted unit X. Pixel texture information of the L-shaped template is $L_0$. One or more candidate templates whose matching degree with $L_0$ is greater than a preset value are searched for in the reconstructed region. The candidate template has a same shape and size with the L-shaped template. In an example of $L_1$ and $L_2$, a predicted pixel value X1 of the to-be-predicted unit X is determined according to a region $P_1$ corresponding to $L_1$ and a region $P_2$ corresponding to $L_2$ (optionally, a relative position relationship between $L_1$ and $P_1$ and a relative position relationship between $L_2$ and $P_2$ are the same as a relative position relationship between $L_0$ and X, and $L_1$ and $L_2$ have a same shape and size with $L_0$). Specifically, a value of the region $P_1$ corresponding to $L_1$ or a value of the region $P_2$ corresponding to $L_2$ that has a higher similarity to $L_0$ may be used as X1, or an average value of $P_1$ and $P_2$ is used as X1.

Processes of determining the predicted pixel values of the to-be-predicted unit by using the straight-line shaped template and the l-shaped template are similar to the process of determining the predicted pixel value of the to-be-predicted unit by using the L-shaped template, and details are not described herein.

S202: A predicted pixel value with a lowest rate-distortion cost (RD cost) is selected from the three predicted pixel values as an optimal predicted pixel value of the to-be-predicted unit.

S203: Calculate a difference between the optimal predicted pixel value and an original pixel value to obtain a residual signal.

S204: Perform transformation and quantization operations on the residual signal to obtain a quantized transform coefficient array.

S205: Scan the quantized transform coefficient array according to a scanning sequence, to obtain a one-dimensional coefficient.

Figure 5:
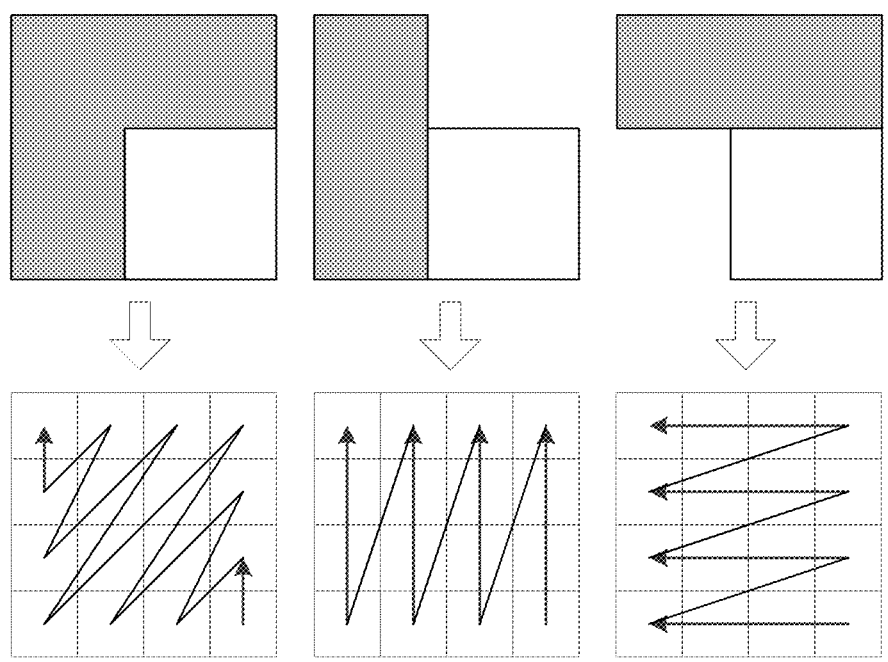
FIG. 5 is a schematic diagram of array scanning sequences corresponding to different templates according to an embodiment of the present disclosure.

In this embodiment, the scanning sequence is determined according to energy distribution of the residual signal. Specifically, as shown in FIG. 5, when a template used to obtain the optimal predicted pixel value is the L-shaped template, energy of the quantized transform coefficient array of the to-be-predicted unit is mainly distributed in the upper left corner of the residual signal, and the scanning sequence is diagonal scanning; or when a template used to obtain the optimal predicted pixel value is the straight-line shaped template, energy of the quantized transform coefficient array of the to-be-predicted unit is mainly distributed on the first several rows from top to bottom of the residual signal, and the scanning sequence is horizontal scanning; or when a template used to obtain the optimal predicted pixel value is the l-shaped template, energy of the quantized transform coefficient array of the to-be-predicted unit is mainly distributed on the first several columns from left to right of the residual signal, and the scanning sequence is vertical scanning.

S206: Perform an entropy coding operation on the one-dimensional coefficient obtained by means of scanning, and write a bit string outputted after the entropy coding operation into a bitstream. To this point, the coding process is completed.

For ease of decoding, the method in this embodiment may further include:

S207: Send, to a decoder side, information about a template that is used to obtain the optimal predicted pixel value of the to-be-predicted unit, where the information about the template is used by the decoder side to perform decoding.

In the method in this embodiment, templates of three shapes are separately used to determine a predicted pixel value of a to-be-predicted unit. If a texture of a to-be-compressed image is complex and variable, when a correlation between a texture of the to-be-predicted unit and a texture of a template of a shape is low, the predicted pixel value is easily impacted by the texture of the template. The templates of the three different shapes are used in this embodiment, and the template of each shape can represent a neighborhood texture direction of the to-be-predicted unit. Therefore, accuracy of an optimal predicted pixel value selected from the three predicted pixel values is higher than accuracy of a predicted pixel value obtained by using a template of a single shape.

The method in this embodiment may be regarded as a supplement to the existing compression coding method. A spatial correlation of an image is fully used to improve prediction accuracy of intra-frame prediction and reduce a residual between a predicted pixel value and an original value, so that an encoder compresses a quantized transform coefficient into fewer bits, thereby increasing video image compression efficiency. Compared with the latest video coding standard High Efficiency Video Coding (HEVC), the method in this embodiment can effectively improve compression efficiency. Experiments show that coding efficiency can be increased by 2.8% on average by using the method in this embodiment.

A difference between still another intra-frame predictive coding method based on template matching disclosed by an embodiment of the present disclosure and the method as shown in FIG. 2 lies in a process of determining a predicted pixel value of a to-be-predicted unit. In an example of this embodiment, N=3, and templates are respectively an L-shaped template, a straight-line shaped template, and a l-shaped template. The process of determining a predicted pixel value of a to-be-predicted unit in this embodiment is shown in FIG. 6(a) and FIG. 6(b) and FIG. 6(c).

As shown in FIG. 6(a), the L-shaped template is used to determine a predicted pixel value of a subunit sj in the to-be-predicted unit, where j=1, 2, . . . , M, and M is an integer greater than or equal to 2. The subunit sj is a region that is in the to-be-predicted unit and adjacent to the L-shaped template. In this embodiment, s1 Us2 U . . . UsM is equal to the to-be-predicted unit. According to the process of determining the predicted pixel value based on template matching in the foregoing embodiments, all predicted pixel values of the to-be-predicted unit can be determined by means of successive iterations from a peripheral region of the to-be-predicted unit that is closest to a reconstructed region.

Four iterations, that is, M=4 is used as an example in FIG. 6(a) and FIG. 6(b) and FIG. 6(c). A manner of using the L-shaped template to determine the predicted pixel value of the subunit sj in each iteration is similar to the process of using the L-shaped template to determine the predicted pixel value of the to-be-predicted unit X in the foregoing embodiment, and the only difference is that a predicted pixel value of a subunit is determined in this embodiment, instead of the predicted pixel value of the whole to-be-predicted unit X. A specific process is shown in FIG. 7.

The L-shaped template is defined in the reconstructed region on top of and on the left of the subunit sj. Pixel texture information of the L-shaped template is $L_0$. One or more candidate templates whose matching degree with $L_0$ is greater than a preset value are searched for in the reconstructed region. The candidate template has a same shape and size with the L-shaped template. In an example of $L_1$ and $L_2$, a predicted pixel value sj1 of the subunit sj is determined according to a region $P_3$ corresponding to $L_1$ and a region $P_4$ corresponding to $L_2$ (optionally, a relative position relationship between $L_1$ and $P_3$ and a relative position relationship between $L_2$ and $P_4$ are the same as a relative position relationship between $L_0$ and sj, and $P_3$ and $P_4$ have a same shape and size with sj). Specifically, a value of the region $P_3$ corresponding to $L_1$ that has a higher similarity to $L_0$ may be used as sj1, or an average value of $P_3$ and $P_4$ is used as sj1.

It can be seen that, the L-shaped template used in each iteration changes correspondingly. For a to-be-predicted unit with a size of N*N, an external side length of an initial L-shaped template is $M_a$, and an internal side length is N. After prediction is performed once, the external side length of the L-shaped template is updated to $M_b$, and the internal side length is N−1, by that analogy, until predicted pixel values of the whole to-be-predicted unit are all generated.

Figure 6:
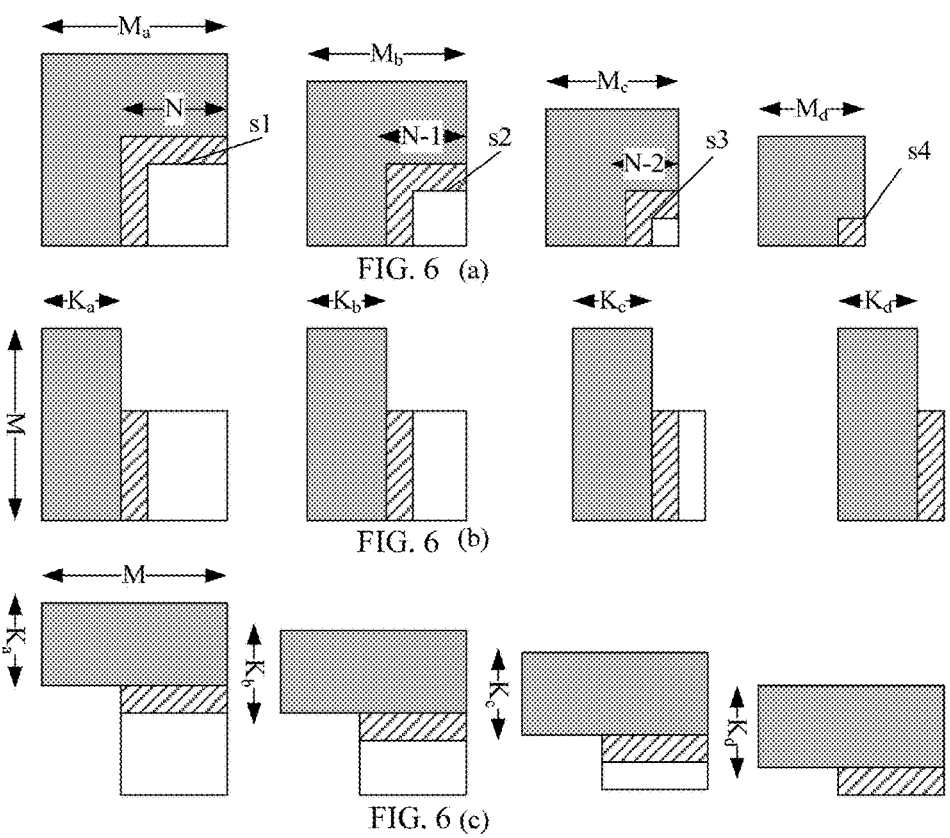
FIG. 6($a$) and FIG. 6($b$) and FIG. 6($c$) are a schematic diagram of a process of determining a predicted pixel value of a to-be-predicted unit according to an embodiment of the present disclosure.
Figure 7:
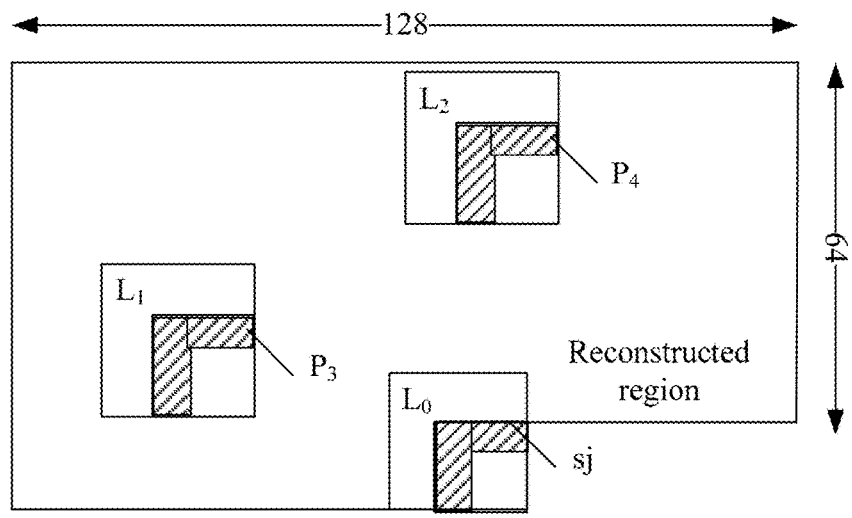
FIG. 7 is a schematic diagram of a process of determining all predicted pixel values of a to-be-predicted unit in sequence by means of successive iterations according to an embodiment of the present disclosure.

Similarly, schematic diagrams of using the straight-line shaped template and the l-shaped template to perform iterations are respectively shown in FIG. 6 (b) and FIG. 6 (c).

After the predicted pixel values of the to-be-predicted unit are determined by using the templates of the three shapes, a subsequent procedure of the method in this embodiment is the same as that of the foregoing embodiment, and details are not described herein.

According to the method for determining a predicted pixel value of a to-be-predicted unit in this embodiment, predicted pixel values are obtained by means of multiple iterations. In each iteration process, because only a predicted pixel value of a subunit adjacent to a template is determined, the obtained predicted pixel value is more accurate. For example, in FIG. 4, a predicted pixel value obtained by using an L-shaped template includes the whole X region, and the lower right corner of the X region is relatively far from the L-shaped template; if a texture of an image varies drastically, accuracy of a predicted pixel value of the lower right corner of the X region may be reduced. This defect is overcome in a process shown in FIG. 5, and accuracy of a predicted pixel value is further improved. Experiments show that, compared with an existing method, compression efficiency can be increased by 3.2% by using the method in this embodiment.

Figure 8:
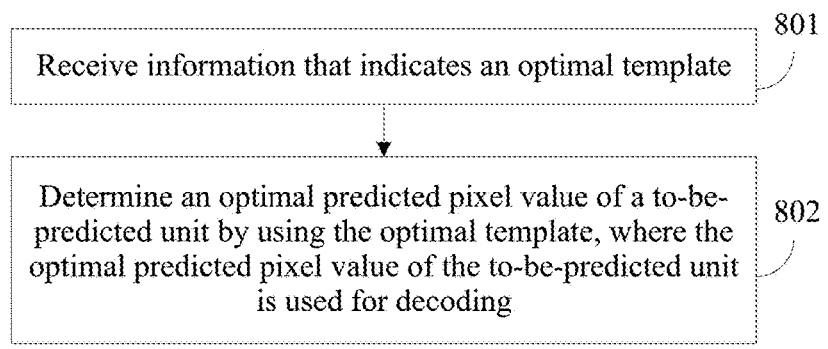
FIG. 8 is a flowchart of an intra-frame predictive decoding method based on template matching according to an embodiment of the present disclosure.

As shown in FIG. 8, an embodiment of the present disclosure further discloses an intra-frame predictive decoding method based on template matching, including:

S801: Receive information that indicates an optimal template.

The optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, where the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2.

S802: Determine an optimal predicted pixel value of a to-be-predicted unit by using the optimal template, where the optimal predicted pixel value of the to-be-predicted unit is used for decoding.

According to the decoding method disclosed by this embodiment, in a decoding process, an optimal template indicated by an encoder side is used to perform intra-frame prediction. In combination with the coding method in the foregoing embodiment, image compression efficiency can be maximized.

Figure 9:
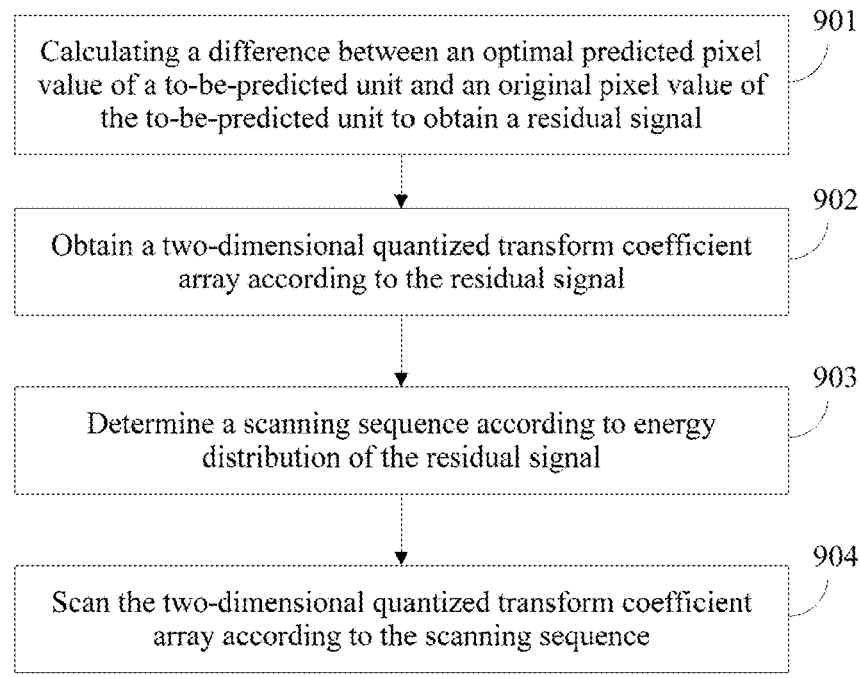
FIG. 9 is a flowchart of an array scanning method according to an embodiment of the present disclosure.

As shown in FIG. 9, an embodiment of the present disclosure further discloses an array scanning method, including:

901: Calculate a difference between an optimal predicted pixel value of a to-be-predicted unit and an original pixel value of the to-be-predicted unit to obtain a residual signal.

The optimal predicted pixel value of the to-be-predicted unit is a predicted pixel value that is in N predicted pixel values of the to-be-predicted unit and meets a preset condition, where the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2.

902: Obtain a two-dimensional quantized transform coefficient array according to the residual signal.

903: Determine a scanning sequence according to energy distribution of the residual signal.

Optionally, in this embodiment, when a template used to obtain the optimal predicted pixel value is an L-shaped template, the scanning sequence is determined as diagonal scanning; or when a template used to obtain the optimal predicted pixel value is a straight-line shaped template, the scanning sequence is determined as horizontal scanning; or when a template used to obtain the optimal predicted pixel value is a l-shaped template, the scanning sequence is determined as vertical scanning.

904: Scan the two-dimensional quantized transform coefficient array according to the scanning sequence.

According to the array scanning method in this embodiment, a scanning sequence is determined according to energy distribution of a residual signal, which can improve scanning efficiency.

Figure 10:
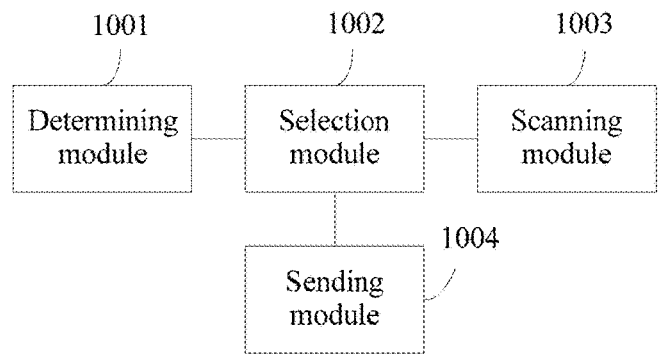
FIG. 10 is a schematic structural diagram of an encoder according to an embodiment of the present disclosure.

Corresponding to the foregoing method embodiments, as shown in FIG. 10, an embodiment of the present disclosure further discloses an encoder, including:

a determining module 1001, configured to determine a predicted pixel value of a to-be-predicted unit by using a template of an $i^{th}$ shape, where the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and a selection module 1002, configured to select a predicted pixel value that is in N predicted pixel values of the to-be-predicted unit and meets a preset condition as an optimal predicted pixel value of the to-be-predicted unit, where the optimal predicted pixel value of the to-be-predicted unit is used for coding.

Optionally, the encoder may further include:

a scanning module 1003, configured to: calculate a difference between the optimal predicted pixel value of the to-be-predicted unit and an original pixel value of the to-be-predicted unit to obtain a residual signal; obtain a two-dimensional quantized transform coefficient array according to the residual signal; determine a scanning sequence according to energy distribution of the residual signal; and scan the two-dimensional quantized transform coefficient array according to the scanning sequence; and a sending module 1004, configured to send, to a decoder side, information about a template that is used to obtain the optimal predicted pixel value of the to-be-predicted unit, where the information about the template is used by the decoder side to perform decoding.

Optionally, a specific implementation manner in which the determining module 1001 is configured to determine the predicted pixel value of the to-be-predicted unit by using the template of the $i^{th}$ shape is as follows:

The determining module determines a predicted pixel value of a subunit sj in the to-be-predicted unit by using a template ix of the $i^{th}$ shape, where the subunit sj is a region that is in the to-be-predicted unit, that has a same shape as the template ix, and that is adjacent to the template ix; j=1, 2, . . . , M; x=1, 2, . . . , M; M is an integer greater than or equal to 2; s1 Us2 U . . . UsM is equal to the to-be-predicted unit; the subunits s1, s2, sM are successively away from an adjacent reconstructed region; and the template ix has a different size.

A specific implementation manner in which the determining module 1001 is configured to calculate the predicted pixel value of the to-be-predicted unit by using the template of the $i^{th}$ shape is as follows:

the determining module is specifically configured to calculate the predicted pixel value of the to-be-predicted unit separately by using the L-shaped template, the straight-line shaped template, and the l-shaped template.

A specific implementation manner in which the scanning module 1003 is configured to determine the scanning sequence according to the energy distribution of the residual signal is as follows:

the scanning module is specifically configured to: when a template used to obtain the optimal predicted pixel value is an L-shaped template, determine that the scanning sequence is diagonal scanning; or when a template used to obtain the optimal predicted pixel value is a straight-line shaped template, determine that the scanning sequence is horizontal scanning; or when a template used to obtain the optimal predicted pixel value is a l-shaped template, determine that the scanning sequence is vertical scanning.

When performing intra-frame prediction, the encoder in this embodiment uses templates of at least two shapes to obtain predicted pixel value s, and select an optimal predicted pixel value from the at least two predicted pixel values. Compared with an existing encoder, the encoder in this embodiment can increase accuracy of intra-frame prediction, thereby increasing coding efficiency.

It should be noted that, the encoder in this embodiment focuses on an intra-frame prediction process based on template matching in a coding process. In practice, in addition to the foregoing core modules, the encoder in this embodiment further includes other modules for transformation/quantization and entropy coding, as shown in FIG. 1.

Figure 11:
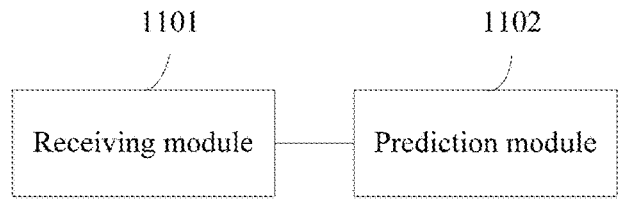
FIG. 11 is a schematic structural diagram of a decoder according to an embodiment of the present disclosure.

As shown in FIG. 11, an embodiment of the present disclosure further discloses a decoder, including:

a receiving module 1101, configured to receive information that indicates an optimal template, where the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, where the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2; and a prediction module 1102, configured to determine the optimal predicted pixel value of the to-be-predicted unit by using the optimal template, where the optimal predicted pixel value of the to-be-predicted unit is used for decoding.

Image compression efficiency can be maximized by combining the foregoing encoder with the decoder in this embodiment in use.

Figure 12:
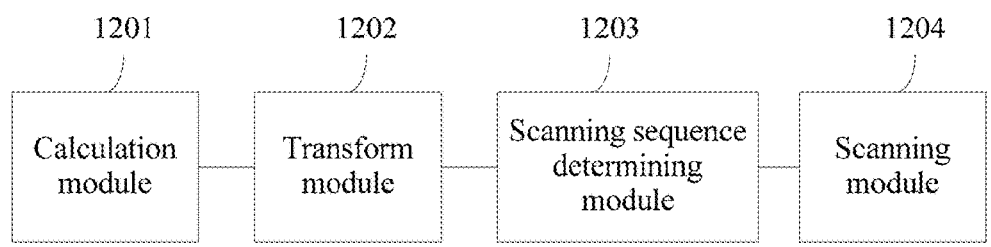
FIG. 12 is a schematic structural diagram of an array scanning apparatus according to an embodiment of the present disclosure.

As shown in FIG. 12, an embodiment of the present disclosure further discloses an array scanning apparatus, including:

a calculation module 1201, configured to calculate a difference between an optimal predicted pixel value of a to-be-predicted unit and an original pixel value of the to-be-predicted unit to obtain a residual signal, where the optimal predicted pixel value of the to-be-predicted unit is a predicted pixel value that is in N predicted pixel values of the to-be-predicted unit and meets a preset condition, where the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, . . . , N, and N is an integer greater than or equal to 2;

a transform module 1202, configured to obtain a two-dimensional quantized transform coefficient array according to the residual signal;

a scanning sequence determining module 1203, configured to determine a scanning sequence according to energy distribution of the residual signal; and a scanning module 1204, configured to scan the two-dimensional quantized transform coefficient array according to the scanning sequence.

Optionally, a specific implementation manner in which the scanning sequence determining module 1203 is configured to determine the scanning sequence according to the energy distribution of the residual signal is as follows:

the scanning sequence determining module is specifically configured to: when a template used to obtain the optimal predicted pixel value is an L-shaped template, determine that the scanning sequence is diagonal scanning; or when a template used to obtain the optimal predicted pixel value is a straight-line shaped template, determine that the scanning sequence is horizontal scanning; or when a template used to obtain the optimal predicted pixel value is a l-shaped template, determine that the scanning sequence is vertical scanning.

The array scanning apparatus in this embodiment determines a scanning sequence according to energy distribution of a residual signal, which can increase scanning efficiency, thereby improving entropy coding performance.

When the functions of the method in the embodiment are implemented in the form of a software functional unit and sold or used as an independent product, the functions may be stored in a computing device-readable storage medium. Based on such an understanding, the part of the embodiments of the present disclosure contributing to the prior art or some of the technical solutions may be implemented in a form of a software product. The software product may be stored in a storage medium, and includes several instructions for instructing a computing device (which may be a personal computer, a server, a mobile computing device, or a network device) to perform all or some of the steps of the methods described in the embodiments of the present disclosure. The foregoing storage medium may include: any medium that can store program code, such as a Universal Serial Bus (USB) flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The foregoing description of the disclosed embodiments enables a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. An intra-frame predictive coding method based on template matching, comprising:

determining N predicted pixel values of a to-be-predicted unit by using a template of an $i^{th}$ shape, wherein the to-be-predicted unit is adjacent to the template of the $i^{th}$ shape, an $i^{th}$ predicted pixel value is determined according to the template of the $i^{th}$ shape, wherein i=1, 2, . . . , N, and N is an integer greater than or equal to 2; and selecting a predicted pixel value that is among the N predicted pixel values of the to-be-predicted unit and meets a preset condition as an optimal predicted pixel value of the to-be-predicted unit, wherein the optimal predicted pixel value of the to-be-predicted unit is used for coding;

wherein the determining N predicted pixel values of a to-be-predicted unit by using a template of an $i^{th}$ shape comprises:

determining a predicted pixel value of a subunit $s_j$ in the to-be-predicted unit by using a template $i_x$ of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 U s_2 U ... U s_M$ is equal to the to-be-predicted unit; the subunits $s_1$, $s_2$, $s_M$ are successively farther away from an adjacent reconstructed region; and the template ix has a different size; and wherein all predicted pixel values of the to-be-predicted unit is determined by successive iterations from a peripheral region of the to-be-predicted unit that is closest to a reconstructed region.

2. The method according to claim 1, further comprising:
calculating a difference between the optimal predicted pixel value of the to-be-predicted unit and an original pixel value of the to-be-predicted unit to obtain a residual signal;
obtaining a two-dimensional quantized transform coefficient array according to the residual signal;
determining a scanning sequence according to energy distribution of the residual signal; and
scanning the two-dimensional quantized transform coefficient array according to the scanning sequence.

3. The method according to claim 2, wherein the determining a scanning sequence according to energy distribution of the residual signal comprises:
when a template used to obtain the optimal predicted pixel value is an L-shaped template, determining that the scanning sequence is diagonal scanning; when a template used to obtain the optimal predicted pixel value is a straight-line shaped template, determining that the scanning sequence is horizontal scanning; and when a template used to obtain the optimal predicted pixel value is a 1-shaped template, determining that the scanning sequence is vertical scanning.

4. The method according to claim 2, further comprising:
obtaining a one-dimensional coefficient upon scanning the two-dimensional quantized transform coefficient array; and
performing an entropy coding operation on the one-dimensional coefficient to obtain a bit string, wherein the bit string is written into a bitstream.

5. The method according to claim 1, wherein the determining a predicted pixel value of a to-be-predicted unit by using a template of an $i^{th}$ shape comprises:
calculating the predicted pixel value of the to-be-predicted unit separately by using an L-shaped template, a straight-line shaped template, and a 1-shaped template.

6. The method according to claim 1, further comprising:
sending, to a decoder side, information about a template that is used to obtain the optimal predicted pixel value of the to-be-predicted unit, wherein the information about the template is used by the decoder side to perform decoding.

7. The method according to claim 1, wherein the preset condition comprises:
a rate-distortion cost (RD cost) is lowest.

8. The method according to claim 1, wherein templates of at least three shapes are separately used to calculate a predicted pixel value of a to-be-predicted unit.

9. An intra-frame predictive decoding method based on template matching, comprising:
receiving information that indicates an optimal template, wherein the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, wherein the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2; and
determining the optimal predicted pixel value of the to-be-predicted unit by using the optimal template, wherein the optimal predicted pixel value of the to-be-predicted unit is used for decoding;
wherein the determining a predicted pixel value of a to-be-predicted unit by using a template of an $i^{th}$ shape comprises:
determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 U s_2 U ... U s_M$ is equal to the to-be-predicted unit; the subunits $s_1$, $s_2$, ..., $s_M$ are successively farther away from an adjacent reconstructed region; and the template ix has a different size; and
wherein all predicted pixel values of the to-be-predicted unit is determined by successive iterations from a peripheral region of the to-be-predicted unit that is closest to a reconstructed region.

10. An array scanning method, comprising:
calculating a difference between an optimal predicted pixel value of a to-be-predicted unit and an original pixel value of the to-be-predicted unit to obtain a residual signal, wherein the optimal predicted pixel value of the to-be-predicted unit is a predicted pixel value that is in N predicted pixel values of the to-be-predicted unit and meets a preset condition, wherein the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2;
obtaining a two-dimensional quantized transform coefficient array according to the residual signal;
determining a scanning sequence according to energy distribution of the residual signal; and
scanning the two-dimensional quantized transform coefficient array according to the scanning sequence;
wherein the determining a predicted pixel value of a to-be-predicted unit by using a template of an $i^{th}$ shape comprises:
determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 U s_2 U ... U s_M$ is equal to the to-be-predicted unit; the subunits $s_1$, $s_2, \ldots, s_M$ are successively farther away from an adjacent reconstructed region; and the template $i_x$ has a different size; and wherein all predicted pixel values of the to-be-predicted unit is determined by successive iterations from a peripheral region of the to-be-predicted unit that is closest to a reconstructed region.

11. The method according to claim 10, wherein the determining a scanning sequence according to energy distribution of the residual signal comprises:

when a template used to obtain the optimal predicted pixel value is an L-shaped template, determining that the scanning sequence is diagonal scanning; when a template used to obtain the optimal predicted pixel value is a straight-line shaped template, determining that the scanning sequence is horizontal scanning; and when a template used to obtain the optimal predicted pixel value is a l-shaped template, determining that the scanning sequence is vertical scanning.

12. An encoder, comprising a computing hardware; and a non-transitory computer-readable storage medium including computer-executable instructions executed by the computing hardware to perform operations comprising:

determining a predicted pixel value of a to-be-predicted unit by using a template of an $i^{th}$ shape, wherein the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2; and selecting a predicted pixel value that is in N predicted pixel values of the to-be-predicted unit and meets a preset condition as an optimal predicted pixel value of the to-be-predicted unit, wherein the optimal predicted pixel value of the to-be-predicted unit is used for coding;

wherein the determining a predicted pixel value of a to-be-predicted unit by using a template of an $i^{th}$ shape comprises:

determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 \cup s_2 \cup \ldots \cup s_M$ is equal to the to-be-predicted unit; the subunits $s_1$, $s_2, \ldots, s_M$ are successively farther away from an adjacent reconstructed region; and the template $i_x$ has a different size; and wherein all predicted pixel values of the to-be-predicted unit is determined by successive iterations from a peripheral region of the to-be-predicted unit that is closest to a reconstructed region.

13. The encoder according to claim 12, the operations further comprising:

calculating a difference between the optimal predicted pixel value of the to-be-predicted unit and an original pixel value of the to-be-predicted unit to obtain a residual signal; obtaining a two-dimensional quantized transform coefficient array according to the residual signal; determining a scanning sequence according to energy distribution of the residual signal; and scanning the two-dimensional quantized transform coefficient array according to the scanning sequence.

14. The encoder according to claim 13, wherein:

the determining a scanning sequence according to energy distribution of the residual signal comprises: when a template used to obtain the optimal predicted pixel value is an L-shaped template, determining that the scanning sequence is diagonal scanning; when a template used to obtain the optimal predicted pixel value is a straight-line shaped template, determining that the scanning sequence is horizontal scanning; and when a template used to obtain the optimal predicted pixel value is a l-shaped template, determining that the scanning sequence is vertical scanning.

15. The encoder according to claim 12, wherein:

determining a predicted pixel value of a to-be-predicted unit by using a template of an $i^{th}$ shape comprises: determining the predicted pixel value of the to-be-predicted unit separately by using an L-shaped template, a straight-line shaped template, and a l-shaped template.

16. The encoder according to claim 12, the operations further comprising:

sending, to a decoder side, information about a template that is used to obtain the optimal predicted pixel value of the to-be-predicted unit, wherein the information about the template is used by the decoder side to perform decoding.

17. A decoder, comprising a computing hardware; and a non-transitory computer-readable storage medium including computer-executable instructions executed by the computing hardware to perform operations comprising:

receiving information that indicates an optimal template, wherein the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, wherein the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2; and determining the optimal predicted pixel value of the to-be-predicted unit by using the optimal template, wherein the optimal predicted pixel value of the to-be-predicted unit is used for decoding;

wherein the determining a predicted pixel value of a to-be-predicted unit by using a template of an $i^{th}$ shape comprises:

determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 \cup s_2 \cup \ldots \cup s_M$ is equal to the to-be-predicted unit; the subunits $s_1$, $s_2, \ldots, s_M$ are successively farther away from an adjacent reconstructed region; and the template $i_x$ has a different size; and wherein all predicted pixel values of the to-be-predicted unit is determined by successive iterations from a peripheral region of the to-be-predicted unit that is closest to a reconstructed region.

18. An array scanning apparatus, comprising a computing hardware; and a non-transitory computer-readable storage medium including computer-executable instructions executed by the computing hardware to perform operations comprising:

calculating a difference between an optimal predicted pixel value of a to-be-predicted unit and an original pixel value of the to-be-predicted unit to obtain a residual signal, wherein the optimal predicted pixel value of the to-be-predicted unit is a predicted pixel value that is in N predicted pixel values of the to-be-predicted unit and meets a preset condition, wherein the N predicted pixel values are determined by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2;
  obtaining a two-dimensional quantized transform coefficient array according to the residual signal;
  determining a scanning sequence according to energy distribution of the residual signal; and
  scanning the two-dimensional quantized transform coefficient array according to the scanning sequence;
  wherein the determining a predicted pixel value of a to-be-predicted unit by using a template of an $i^{th}$ shape comprises:
  determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 U s_2 U \ldots U s_M$ is equal to the to-be-predicted unit; the subunits $s_1$, $s_2$, ..., $s_M$ are successively farther away from an adjacent reconstructed region; and the template $i_x$ has a different size; and
  wherein all predicted pixel values of the to-be-predicted unit is determined by successive iterations from a peripheral region of the to-be-predicted unit that is closest to a reconstructed region.

19. The array scanning apparatus according to claim 18, wherein:

the determining a scanning sequence according to energy distribution of the residual signal comprises: when a template used to obtain the optimal predicted pixel value is an L-shaped template, determining that the scanning sequence is diagonal scanning; when a template used to obtain the optimal predicted pixel value is a straight-line shaped template, determining that the scanning sequence is horizontal scanning; and when a template used to obtain the optimal predicted pixel value is a l-shaped template, determining that the scanning sequence is vertical scanning.

20. A processor and a non-transitory computer-readable memory storing processor-executable instructions; and a processor operatively coupled to the memory, the processor being configured to execute executed by the processor to perform operations comprising:

receiving information that indicates an optimal template, wherein the optimal template is a template that is used by an encoder side to obtain an optimal predicted pixel value of a to-be-predicted unit, the optimal predicted pixel value of the to-be-predicted unit is a predicted pixel value that is in N predicted pixel values of the to-be-predicted unit and meets a preset condition, wherein the N predicted pixel values are determined by the encoder side by using a template of an $i^{th}$ shape, the to-be-predicted unit is adjacent to the template of the $i^{th}$ shape, an $i^{th}$ predicted pixel value is determined according to the template of the $i^{th}$ shape, i=1, 2, ..., N, and N is an integer greater than or equal to 2; and
  determining the optimal predicted pixel value of the to-be-predicted unit by using the optimal template, wherein the optimal predicted pixel value of the to-be-predicted unit is used for decoding;
  wherein the determining a predicted pixel value of a to-be-predicted unit by using a template of an $i^{th}$ shape comprises:
  determining a predicted pixel value of a subunit $s_j$ in the to-be-predicted unit by using a template ix of the $i^{th}$ shape, wherein the subunit $s_j$ is a region that is in the to-be-predicted unit, and the region of the subunit $s_j$ has a same shape as the template $i_x$, and that is adjacent to the template $i_x$; j=1, 2, ..., M; x=1, 2, ..., M; M is an integer greater than or equal to 2; $s_1 U s_2 U \ldots U s_M$ is equal to the to-be-predicted unit; the subunits $s_1$, $s_2$, ..., $s_M$ are successively farther away from an adjacent reconstructed region; and the template $i_x$ has a different size; and
  wherein all predicted pixel values of the to-be-predicted unit is determined by successive iterations from a peripheral region of the to-be-predicted unit that is closest to a reconstructed region.

* * * * *